(12) United States Patent
Wendeberg et al.

(10) Patent No.: US 9,822,814 B2
(45) Date of Patent: Nov. 21, 2017

(54) BEARING FOR COMBINED LOADS

(71) Applicant: AKTIEBOLAGET SKF, Goteborg (SE)

(72) Inventors: Hans Wendeberg, Västra Frölunda (SE); Jonas Kullin, Landvetter (SE)

(73) Assignee: AKTIEBOLAGET SKF, Goeteborg (SE)

( * ) Notice: Subject to any disclaimer, the term of this patent is extended or adjusted under 35 U.S.C. 154(b) by 0 days.

(21) Appl. No.: 15/029,671

(22) PCT Filed: Oct. 10, 2014

(86) PCT No.: PCT/SE2014/051201
§ 371 (c)(1),
(2) Date: Apr. 15, 2016

(87) PCT Pub. No.: WO2015/057137
PCT Pub. Date: Apr. 23, 2015

(65) Prior Publication Data
US 2016/0238070 A1 Aug. 18, 2016

(30) Foreign Application Priority Data
Oct. 17, 2013 (SE) ........................................ 1300660

(51) Int. Cl.
| F16C 23/08 | (2006.01) |
|---|---|
| F16C 19/38 | (2006.01) |
| F16C 19/54 | (2006.01) |
| F16C 19/50 | (2006.01) |

(52) U.S. Cl.
CPC ............ *F16C 23/084* (2013.01); *F16C 19/38* (2013.01); *F16C 19/505* (2013.01); *F16C 19/54* (2013.01); *F16C 23/08* (2013.01); *F16C 23/086* (2013.01); *F16C 2240/34* (2013.01)

(58) Field of Classification Search
CPC .......... F16C 19/18; F16C 19/38; F16C 19/54; F16C 19/541; F16C 19/542; F16C 19/56; F16C 23/08; F16C 23/086; F16C 23/088
See application file for complete search history.

(56) References Cited

U.S. PATENT DOCUMENTS 561,861 A * 6/1896 Brisco ................... F16C 19/181
384/461
2,488,929 A * 11/1949 Palumbo ................. F16C 19/38
384/461
(Continued)

FOREIGN PATENT DOCUMENTS

| DE | 102010054318 A1 | 6/2012 |
|---|---|---|
| DE | 102010054319 A1 | 6/2012 |

(Continued)

*Primary Examiner* — Phillip A Johnson
(74) *Attorney, Agent, or Firm* — 2SPL Patentanwaelte PartG mbB; Mani Arabi (57) ABSTRACT

A bearing (8) comprising a first row of rolling elements (10, 10a, 10b, 12, 12a, 12b) having a first pressure center (14) and a first contact angle, and a second row of rolling elements (10, 10a, 10b, 12, 12a, 12b) having a second pressure center (14) and a second contact angle, whereby said first pressure center (14) is arranged to coincide with said second pressure center (14) and whereby said first contact angle is the same as said second contact angle.

12 Claims, 7 Drawing Sheets

(56) References Cited

U.S. PATENT DOCUMENTS

| | | | | |
|---|---|---|---|---|
| 2,819,127 A * | 1/1958 | Grobey | ............... | F16C 19/54 |
| | | | | 384/461 |
| 2,822,225 A * | 2/1958 | Teufel | ............... | F16C 19/55 |
| | | | | 384/461 |
| 3,011,364 A * | 12/1961 | Mims | ............... | F16C 19/55 |
| | | | | 384/461 |
| 3,799,633 A * | 3/1974 | Pizzotti | ............... | D06F 37/00 |
| | | | | 384/461 |
| 4,045,100 A * | 8/1977 | Beauchet | ............... | F16C 19/38 |
| | | | | 384/461 |
| 4,253,712 A * | 3/1981 | Rixon | ............... | F16C 19/10 |
| | | | | 384/496 |
| 5,820,272 A | 10/1998 | Okner | | |
| 8,630,062 B2 * | 1/2014 | Shimizu | ............... | F16C 19/56 |
| | | | | 360/99.08 |
| 8,646,982 B2 * | 2/2014 | Radinger | ............... | F16C 19/55 |
| | | | | 384/461 |
| 2002/0085677 A1 | 7/2002 | Ratzmann | | |
| 2012/0141058 A1 | 6/2012 | Radinger et al. | | |

FOREIGN PATENT DOCUMENTS

| | | | |
|---|---|---|---|
| GB | 191501133 A | 0/1915 | |
| WO | 2010037370 A1 | 4/2010 | |

\* cited by examiner

BEARING FOR COMBINED LOADS

TECHNICAL FIELD

The present invention concerns a bearing, namely a rolling element bearing.

BACKGROUND OF THE INVENTION

Bearings support a shaft to permit its free motion about an axis of rotation. Load can be applied to bearings in either of two basic directions. Radial load acts at right angles to the shaft. Axial load (thrust) acts parallel to the axis of rotation. When these loads are offset from either the bearing axis or radial plane of the bearing, a resulting moment load will be created. Bearings are available in a variety of types to handle radial loads, axial loads and moment loads.

SUMMARY OF THE INVENTION

An object of the invention is to provide an improved bearing that is suitable for applications in which it may be subjected to combined loads, i.e. radial and axial loads, or to large axial loads in one or two directions. A "large axial load" is intended to mean application in which the axial load constitutes a substantial part of the radial load, for example application in which the axial load is 0.2-1000 times as large as the radial load.

This object is achieved by a bearing having a bearing axis and comprising a first row of rolling elements having a first pressure centre and a first contact angle, first row of rolling elements having a second pressure centre and a second contact angle, whereby the first pressure centre is arranged to coincide with the second pressure centre, i.e. whereby the first row of rolling elements and the second row of rolling elements are arranged to have a common pressure centre and whereby the first contact angle and the second contact angle are on the same side of a plane perpendicular to the bearing axis, i.e. the first contact angle and the second contact angle have the same sign, i.e. ++ or −−. A contact angle is formed by a straight line drawn between the points of contact of the rolling elements with the raceways and a plane perpendicular to the bearing axis. Contact angles having the same sign are on the same side of said plane perpendicular to the bearing axis.

Such a bearing can accommodate radial loads in addition to axial loads, which makes the bearing suitable for use in applications where there are combined loads. This means that one such bearing can be used instead of a combination of a radial bearing and a thrust bearing. This ability to accommodate combined loads enables economical, space saving compact bearing designs that can provide a high degree of axial and radial stiffness, under heavy load conditions. Such a bearing may for example be used to accommodate a radial load up to 55% of a simultaneously acting axial load. Such a self-aligning bearing can also accommodate misalignment and shaft deflections, and low as well as high speeds.

Use of a bearing according to the present invention ensures smooth running and a long service life as a result of the features recited in claim 1, which give the raceways and rolling elements of the bearing an optimized balance between contact pressure and friction. Low internal friction permits the bearing to operate from very low to very high speeds.

The bearing design according to the present invention enables a user to adapt a bearing to a particular application depending on the loads to which the bearing will be subjected during its use. The contact angles for the first and second rows of rolling elements may be optimized depending on the magnitudes of the axial load and the radial load in one or two directions. In applications, such as wind turbines, a first row of rolling elements may for example be subjected to a large axial load in one direction and the second row of rolling elements may be subjected to a smaller axial load in the opposite direction and contact angles may be chosen accordingly.

According to an embodiment of the invention the first row of rolling elements constitutes an inner row of rolling elements and the second row of rolling elements constitutes an outer row of rolling elements, and any of the outer or inner row of rolling elements is arranged to carry a radial load when the bearing is in use. According to another embodiment of the invention the outer and inner row of rolling elements are also arranged to carry axial loads in opposite directions when the bearing is in use.

According to an embodiment of the invention the first row of rolling elements constitutes an inner row of rolling elements and the second row of rolling elements constitutes an outer row of rolling elements, wherein the inner row and the outer row are relatively displaced in a radial direction of the bearing. In a further embodiment, the first row and the second row of rolling elements are also located such that the outer row and the inner row of rolling elements are at least partly overlapping each other in an axial direction of the bearing. The radial displacement is thus such that the outer row and the inner row will not interfere with each other. By the provision of this configuration a more compact bearing is achieved. In further embodiments, the outer and inner row of rolling elements are overlapping each other in an axial direction by at least 10%, 20%, 30%, 40%, 50%, 60%, 70%, 80%, 90% or 100%. The extent of the axial overlap may depend on the current requirements of the bearing in its intended application, i.e. expected radial and axial forces exerted on the bearing, the amount of space available in the application etc.

According to a further embodiment of the invention the rolling elements are symmetrical. Alternatively, the rolling elements are asymmetrical.

According to an embodiment of the invention the bearing is one of the following: a spherical roller bearing, a toroidal roller bearing, a ball bearing or a combination thereof.

According to another embodiment of the invention the bearing is a self-aligning bearing. It may for example have spherical rolling elements and a common sphered raceway in its outer ring.

According to an embodiment of the invention the bearing comprises at least two rows of rolling elements (i.e. including the first row of rolling elements and the second row of rolling elements) and a plurality of bearing rings, such as two or three bearing rings. Any of the bearing rings may be arranged to rotate or to remain stationary when the bearing is in us, i.e. any of the rings, i.e. an inner ring, a central ring or intermediate ring or an outer ring, may be arranged to be mounted on a rotatable shaft when the bearing is in use.

According to an exemplifying embodiment, the bearing comprises a first ring, a second ring and an intermediate ring, wherein the outer row of rolling elements is interposed in between an outer raceway of the first ring and an outer raceway of the intermediate ring and wherein the inner row of rolling elements is interposed in between an inner raceway of the intermediate ring and an inner raceway of the second ring. By this configuration, the rolling elements of the outer row of rolling elements and the rolling elements of the inner row of rolling elements will rotate in opposite directions. Furthermore, this will allow the bearing to be able to accommodate radial loads, but also axial loads in both directions.

Thus, it provides a compact bearing that is able to accommodate combined axial loads (in both directions) and radial loads. In a further embodiment, the first and second rings are connected or integrated, i.e. the first and second rings may be seen as one unified ring.

According to another embodiment of the invention the bearing comprises more than two rows of rolling elements, whereby each row of rolling elements has a pressure centre and all the pressure centres are arranged to coincide, i.e. all of the rows of rolling elements are arranged to have a common pressure centre.

According to a further embodiment of the invention the bearing is separable, whereby the mounting and dismounting procedure is facilitated. A shaft washer with cage and roller assembly and a housing washer of the bearing may for example be arranged to be mounted/dismounted separately.

According to an embodiment of the invention the bearing constitutes one of the following types of bearing: SRB (Spherical roller bearing), SAT (Self-Aligning Torus bearing), SRTB (Spherical Roller Thrust Bearing), ACBB (Angular Contact Ball Bearing).

The bearing according to the present invention may be used in automotive, aerospace, railroad, mining, construction, wind, marine, metal producing, material handling, or any other machine applications.

BRIEF DESCRIPTION OF THE DRAWINGS

The present invention will hereinafter be further explained by means of non-limiting examples with reference to the appended schematic figures where.

It should be noted that the drawings have not been drawn to scale and that the dimensions of certain features have been exaggerated for the sake of clarity.

Furthermore, any feature or features of one embodiment of the invention can be combined with any other feature or features of any other embodiment of the invention as long as there is no conflict.

DETAILED DESCRIPTION OF EMBODIMENTS

FIGS. 1-4 schematically show a cross section (defined as a plane coinciding with the axial direction of the bearing 8) of a bearing 8 according to the present invention comprising a first inner row of rolling elements 10 having a first pressure centre, and a second outer row of rolling elements 12 having a second pressure centre, whereby the first pressure centre is arranged to coincide with the second pressure centre at a common pressure centre 14 and said first contact angle and said second contact angle are on the same side of a plane perpendicular to said bearing axis. In addition, in these specific embodiments, the outer row of rolling elements 12 and the inner row of rolling elements 10 are displaced in a radial direction of the bearing 8. In addition, the outer row 12 and the inner row 10 are overlapping each other at least partly in the axial direction of the bearing 8, which leads to a more compact bearing 8. The rows do not necessarily need to overlap in the axial direction, depending e.g. on the level of compactness that is wanted in the specific application. In addition, the contact angles can be modified depending on the load situation in the bearing's 8 intended application.

The rolling elements 10 and 12 are arranged in between a stationary component 16 and a rotatable component 18 that is to be mounted on a shaft, but the components 12, 18 may also be mounted so that the component 16 is rotating and the component 18 is stationary. The second outer row of rolling elements 12 may be arranged to carry a radial load when the bearing 8 is in use, and optionally also an axial load in one direction. Furthermore, the inner row 10 may then be able to carry an axial load in the other axial direction.

Figure 1:
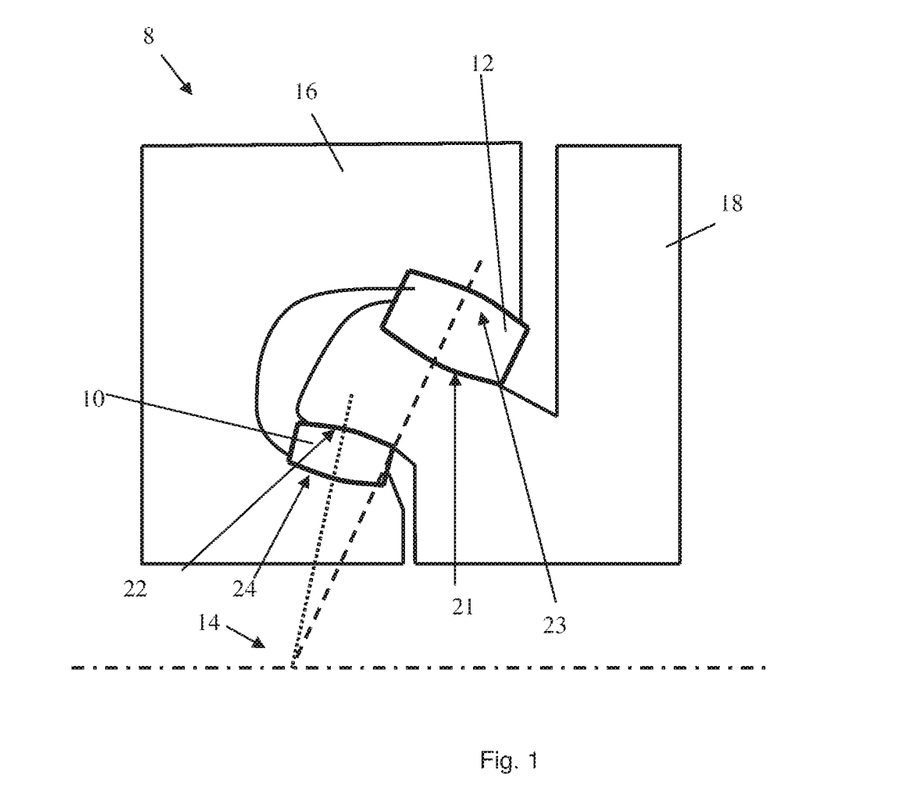
FIGS. 1-4 show cross sections of bearings according to embodiments of the present invention.

In FIG. 1, the component 18 (or intermediate ring 18) presents an outer raceway 21 and an inner raceway 22. The component 16 presents an outer raceway 23 and an inner raceway 24. In one embodiment, the component 16 is split into two rings, comprising a first ring and a second ring (not shown in this figure). By this configuration of the components 16 and 18 and its corresponding raceways 21-24, the rolling elements of the outer row of rolling elements 12 and the rolling elements of the inner row 10 of rolling elements will rotate in opposite directions when the bearing 8 is in operation. Furthermore, this will allow the bearing 8 to be able to accommodate radial loads, but also axial loads in both directions.

In FIG. 1 the bearing 8 has asymmetrical rolling elements 10, 12, a flange on the rings, sphered raceways, and rolling elements 10, 12 with different contact angles.

Figure 2:
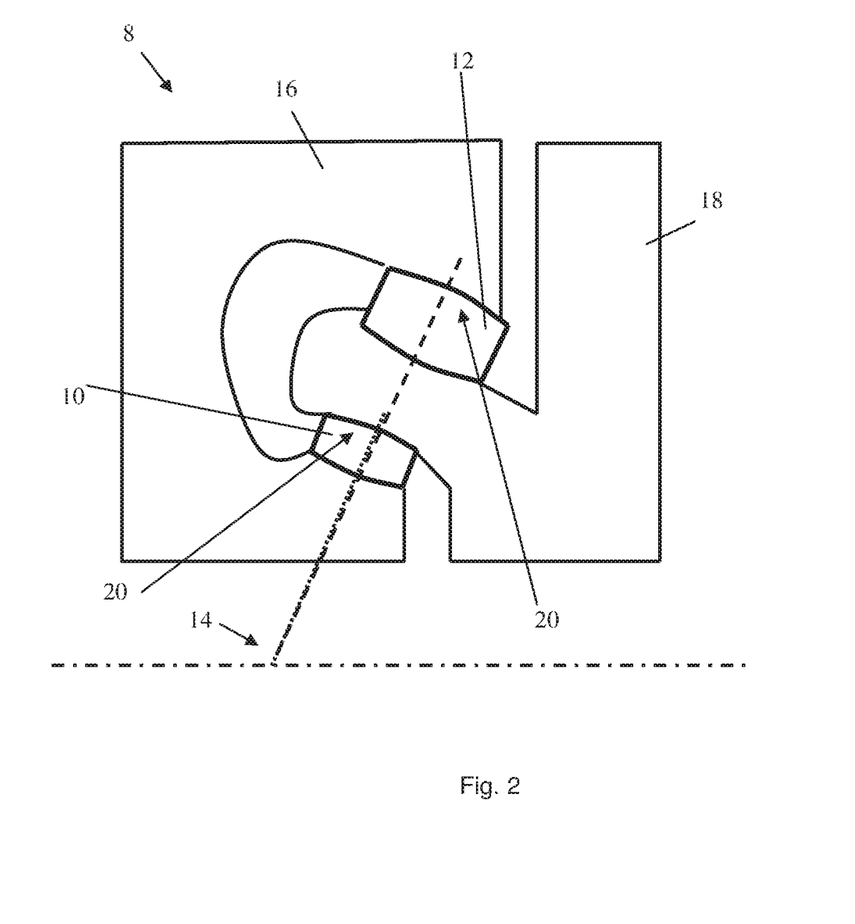

In FIG. 2 the bearing 8 has asymmetrical rolling elements 10, 12, a flange on the rings, sphered raceways, and rolling elements 10, 12 with the same contact angle.

Figure 3:
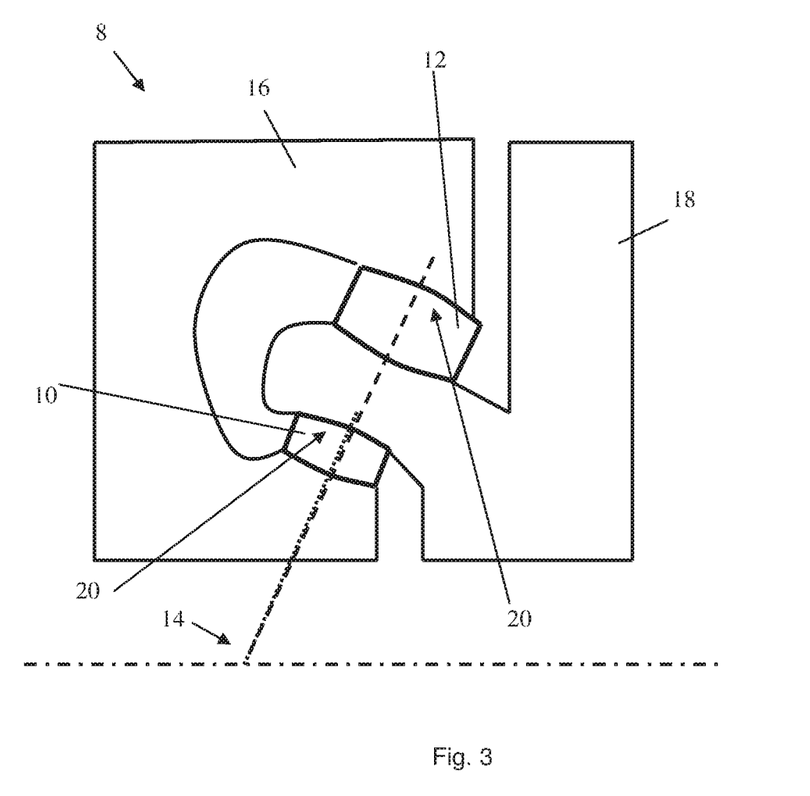

In FIG. 3 the bearing 8 has symmetrical rolling elements 10, 12, no flange on the rings, sphered raceways, and rolling elements 10, 12 with the same contact angle.

Figure 4:
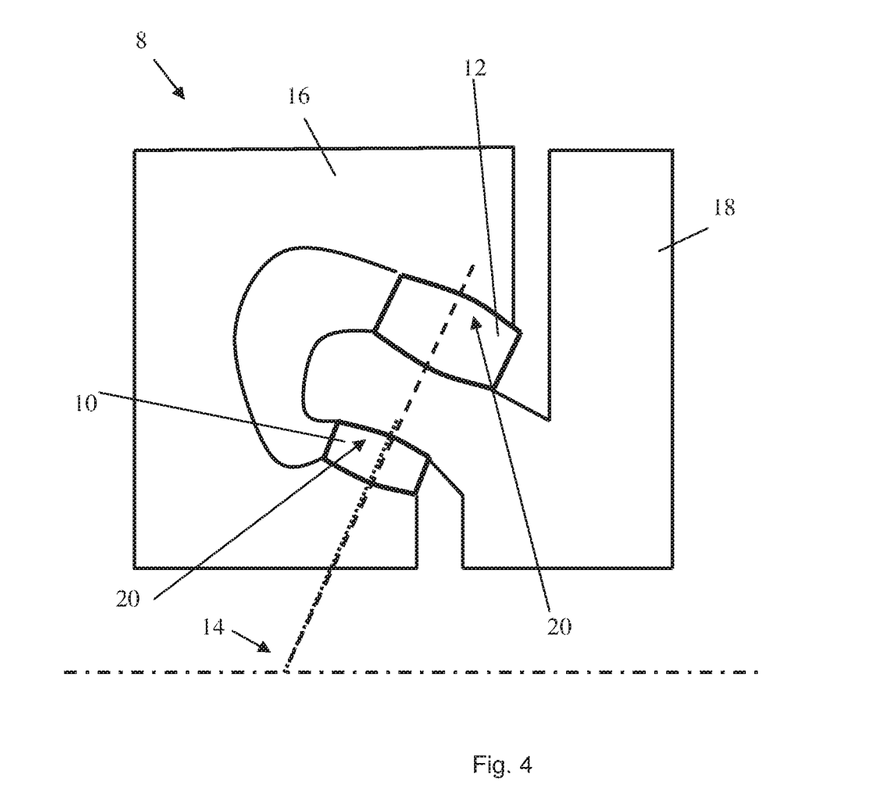

In FIG. 4 the bearing 8 has symmetrical rolling elements 10, 12, no flange on the rings, toroidal raceways, and rolling elements 10, 12 with the same contact angle (i.e. FIG. 4 shows a toroidal roller bearing).

It should be noted that a bearing 8 according to the present invention need not necessarily comprise a flange on a bearing ring. Furthermore, a bearing 8 according to the present invention may have contact angles of 90° to 0°.

Figure 5:
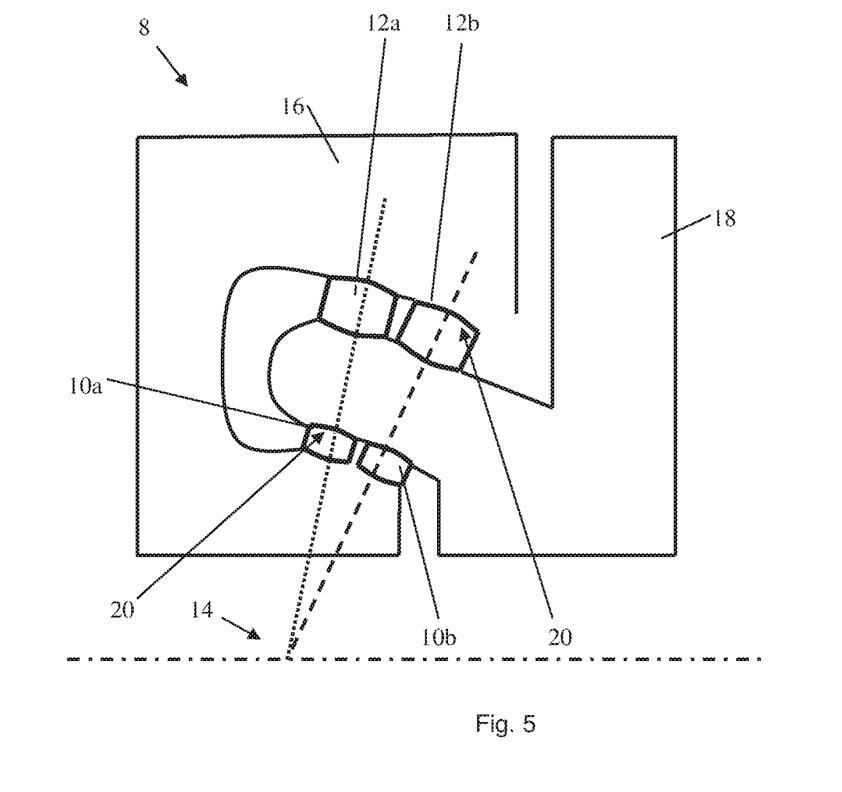
FIG. 5 shows a cross section of a self-aligning bearing according to an embodiment of the present invention.

FIG. 5 shows a self-aligning bearing 8 according to an embodiment of the invention. The bearing 8 comprises four rows of rolling elements 10a, 10b, 12a, 12b whereby the pressure centre of all of the rows of rolling elements 10a, 10b, 12a, 12b is arranged to coincide at a common pressure centre 14. The bearing 8 comprises a common sphered raceway 20 for two of the adjacent inner rows of rolling elements 10a and 10b and a common sphered raceway 20 for the other two adjacent rows of outer rolling elements 12a and 12b. Such a self-aligning bearing 8 provides smooth, friction-free adjustment over a broad range of operating conditions. Further, in this specific embodiment, the inner row of rolling elements 10a and 10b are overlapping the outer row of rolling elements 12a and 12b in the axial direction of the bearing 8. As can be seen from the figure, the axial overlap in this specific embodiment is relatively large, up to at least 80% of the axial width of the outer row of rolling elements 12a and 12b. The contact angles of the outer rows 12 a, b and the inner rows 10a, b may be adjusted within the scope of the invention depending on the current load situation in the application in which the bearing 8 shall operate. Due to the configuration of the bearing 8, the rolling elements of the outer rows of rolling elements 12*a, b* will rotate in one direction and the rolling elements of the inner rows of rolling elements 10*a, b* will rotate in the opposite direction.

It should be noted that a bearing according to the present invention may comprise any number of rows of rolling elements, i.e. 2, 3, 4 or more. Furthermore, any number of rows may be located adjacently. For example two adjacent outer rows of rolling elements may be located above a single inner row of rolling elements, whereby these rows of rolling elements are arranged to have a common pressure centre.

According to an embodiment of the invention the bearing 8 comprises at least two rows of rolling elements and three bearing 8 rings, whereby an outer ring may be arranged to comprise a common sphered raceway 20 for a plurality of rows of rolling elements. The three bearing rings can comprise an inner ring, a central ring (intermediate ring) and an outer ring, and the central ring may be arranged to be mounted on a rotatable shaft when the bearing 8 is in use.

Figure 6:
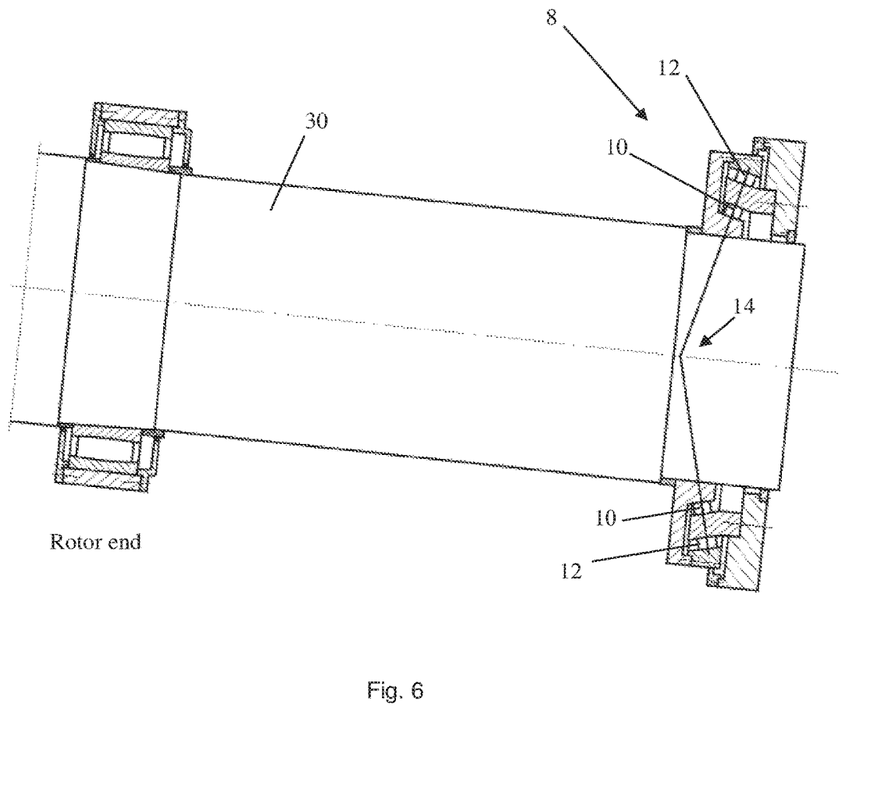
FIG. 6 shows a cross section of a bearing according to an embodiment of the invention mounted on a shaft.

FIG. 6 shows a bearing 8 according to an embodiment of the invention mounted on a shaft 30. The bearing 8 comprises a first inner row of rolling elements 10 having a first pressure centre, and a second row of rolling elements 12 having a second pressure centre, whereby the first pressure centre is arranged to coincide with the second pressure centre at a common pressure centre 14. The shaft 30 may comprise a rotor at a rotor end thereof and the bearing 8 in the illustrated embodiment is mounted at the non-rotor end of the shaft 2. A bearing 8 according to the present invention may however be alternatively or additionally mounted at the rotor end of the shaft 30. FIG. 6 shows that a bearing 8 according to the present invention may be used with another bearing at the opposite end of a shaft 30.

Figure 7:
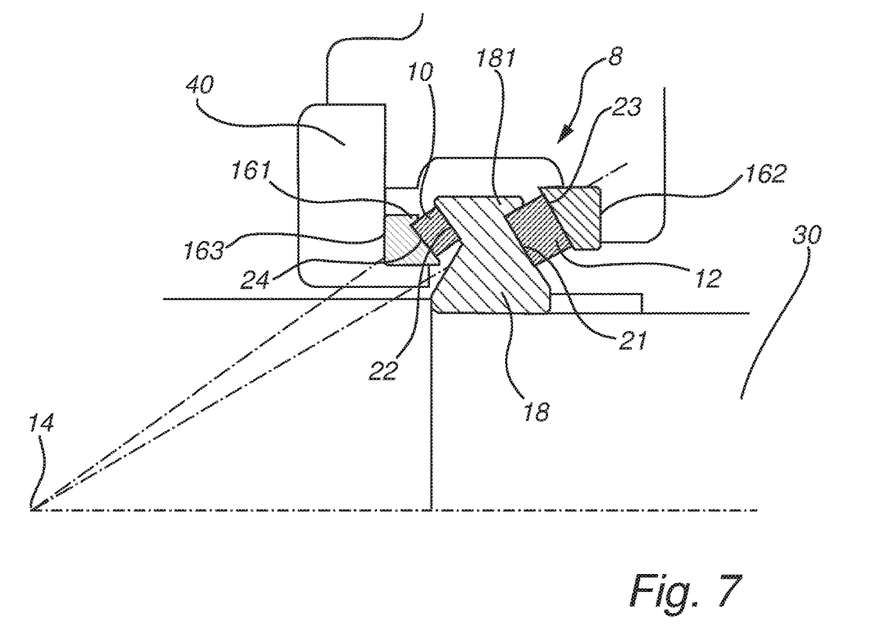
FIG. 7 shows a cross section of a bearing according to an embodiment of the invention mounted on a shaft.

FIG. 7 shows a cross section of another embodiment of a bearing 8 according to the invention, which is mounted onto a shaft 30. Further, the bearing 8 is mounted into a housing structure 40 allowing the shaft 30 to rotate relative the housing structure 40. The bearing 8 comprises an outer row of rolling elements 12 and an inner row of rolling elements 10. In this specific embodiment, the roller elements in the rolling rows 12 and 10 are asymmetrical spherical rollers and further the bearing 8 comprises flanges 181 and for the outer and inner row 12 and 10 respectively. The bearing comprises an outer ring 162, an inner ring 163 and an intermediate ring 18. The outer row of rolling elements and the inner row of rolling elements 10 present a common pressure center 14 but with different contact angles as can be seen from the illustration. The contact angles are on the same side of a plane perpendicular to said bearing axis. In addition, the outer ring 162 presents a spherical outer raceway 23 and the inner ring 163 presents a spherical inner raceway 24, and the intermediate ring 18 presents a spherical outer raceway 21 and a spherical inner raceway 22. By this configuration of the components 162, 163 and 18 and its corresponding raceways 21-24, the rolling elements of the outer row of rolling elements and the rolling elements of the inner row of rolling elements 10 will rotate in opposite directions when the bearing 8 is in operation. Furthermore, this will allow the bearing 8 to be able to accommodate radial loads, but also axial loads in both directions. The shaft 30 may be arranged with two bearings, i.e. the bearing 8 and a further radial bearing mounted onto the shaft 30 (not shown), such as a toroidal roller bearing or any other suitable radial bearing. When in operation, i.e. when the shaft 30 is rotating relative the housing structure 40, the intermediate ring 18 will rotate with the shaft 30 and the outer ring 162 and the inner ring 163 will be stationary with the housing structure 40. Further, with the contact angles as seen in FIG. 7, the bearing 8 will be able to accommodate relatively large axial forces in both axial directions of the shaft. By modifying the contact angles of the outer and inner row of rolling elements 12 and 10 respectively, the bearing 8 can be optimized for different specific load situations (radial forces, axial forces and especially combinations thereof). A person skilled in the art will be able to make such modifications for optimizing the bearing 8 for its specific intended use. In addition, due to the curved configuration of the raceways 21-24, the bearing 8 will be able to accommodate misalignments of the shaft 30 relative the housing structure 40. In this embodiment, the curved raceway profiles are spherical, but the curved profiles may for instance also be in a torus form.

The bearing 8 may be separable into any number of individual components so as to facilitate mounting and dismounting of the bearing 8. A shaft washer with cage, a rolling element assembly and a housing washer of the bearing 8 may for example be arranged to be mounted/dismounted separately. The bearing 8 according to the invention may constitute one of the following types of bearing: SAT, SRTB, ACBB.

A bearing 8 according to the present invention may be of any size and have any load-carrying capacity. An inner ring and/or an outer ring of the bearing 8 may for example have a diameter up to a few meters and a load-carrying capacity up to many thousands of tonnes.

The bearing 8 may have an open design, or a sealed design with contact seals on one or both sides of the bearing 8, and/or it may have an extended inner ring.

Further modifications of the invention within the scope of the claims would be apparent to a skilled person. For example, a bearing according to the present invention may comprise at least one coated component, such as a component comprising a corrosion protection layer and/or at least one separable component. The bearing may comprise at least one sensor, such as a load and/or temperature sensor to monitor the status of the bearing, it may have any suitable row configuration adapted for a particular application and/or comprise any suitable material or materials.

The invention claimed is:

1. A bearing for supporting a rotatable component with respect to a housing having a bearing axis and comprising:
    a first row of rolling elements having a first pressure centre and a first contact angle,
    a second row of rolling elements having a second pressure centre and a second contact angle,
    wherein an outer raceway for the first row of rolling elements and an inner raceway for the second row of rolling elements both are fixed with respect to the rotatable component;
    wherein an inner raceway for the first row of rolling elements and an outer raceway for the second row of rolling elements both are fixed with respect to the housing; and
    wherein said first pressure centre is arranged to coincide with said second pressure centre and said first contact angle and said second contact angle are on the same side of a plane perpendicular to said bearing axis.

2. The bearing according to claim 1, characterized in that said first row of rolling elements constitutes an inner row of rolling elements and said second row of rolling elements constitutes an outer row of rolling elements, and any of said outer or inner row of rolling elements is arranged to carry a radial load when said bearing is in use.

3. The bearing according to claim 2, characterized in that said outer and inner row of rolling elements are also arranged to carry axial loads in opposite directions when said bearing is in use.

4. The bearing according to claim 1, characterized in that said first and second rows of rolling elements are symmetrical.

5. The bearing according to claim 1, characterized in that said first and second rows of rolling elements are asymmetrical.

6. The bearing according to claim 1, characterized in that the bearing is one of the following: a spherical roller bearing, a toroidal roller bearing, or a combination thereof.

7. The bearing according to claim 1, characterized in that the bearing is a self-aligning bearing.

8. The bearing according to claim 1 characterized in that the bearing comprises at least two rows of rolling elements, including said first row of rolling elements and said second row of rolling elements, and a plurality of bearing rings.

9. The bearing according to claim 1, characterized in that the bearing comprises more than two rows of rolling elements, whereby each row of rolling elements has a pressure centre and all said pressure centres are arranged to coincide.

10. The bearing according to claim 1, characterized in that the bearing is separable.

11. The bearing according to claim 1, characterized in that the bearing constitutes one of the following types of bearing: SAT, SRTB, ACBB.

12. The bearing according to claim 1, characterized in that the first row of rolling elements are of different dimensions than the second row of rolling elements.

* * * * *